March 12, 1968 A. E. AMANTI ET AL 3,372,611
TORQUE WRENCHES AND TEST STANDS
Filed July 11, 1966 8 Sheets-Sheet 1
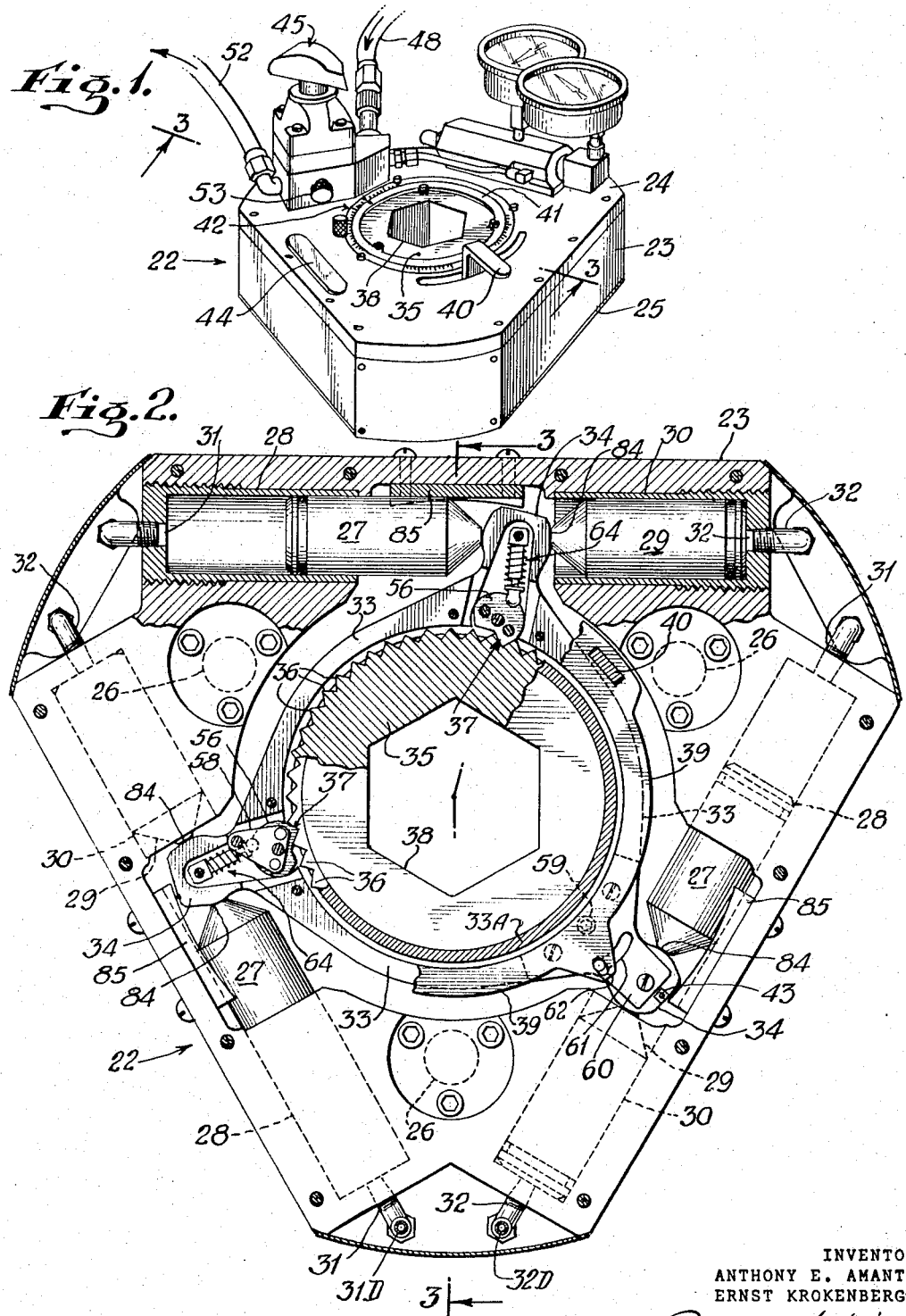
INVENTORS
ANTHONY E. AMANTI
ERNST KROKENBERGER
BY Robert H. Ware
ATTORNEYS

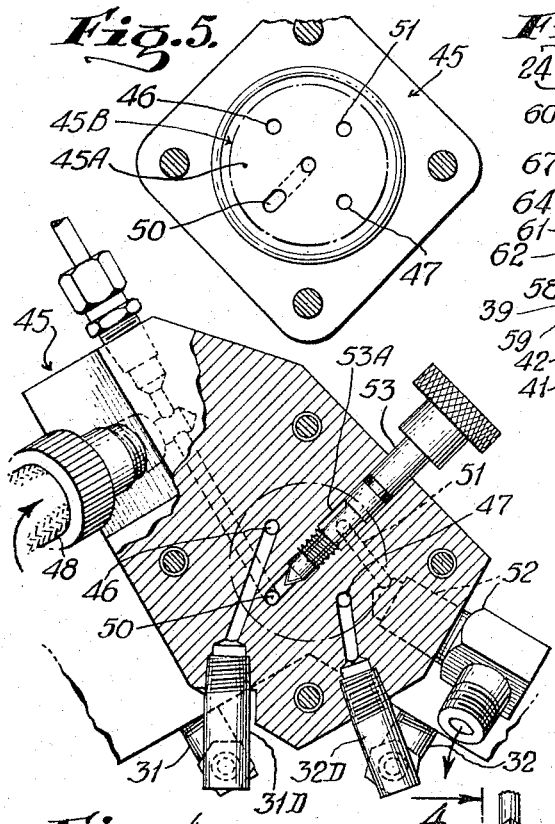
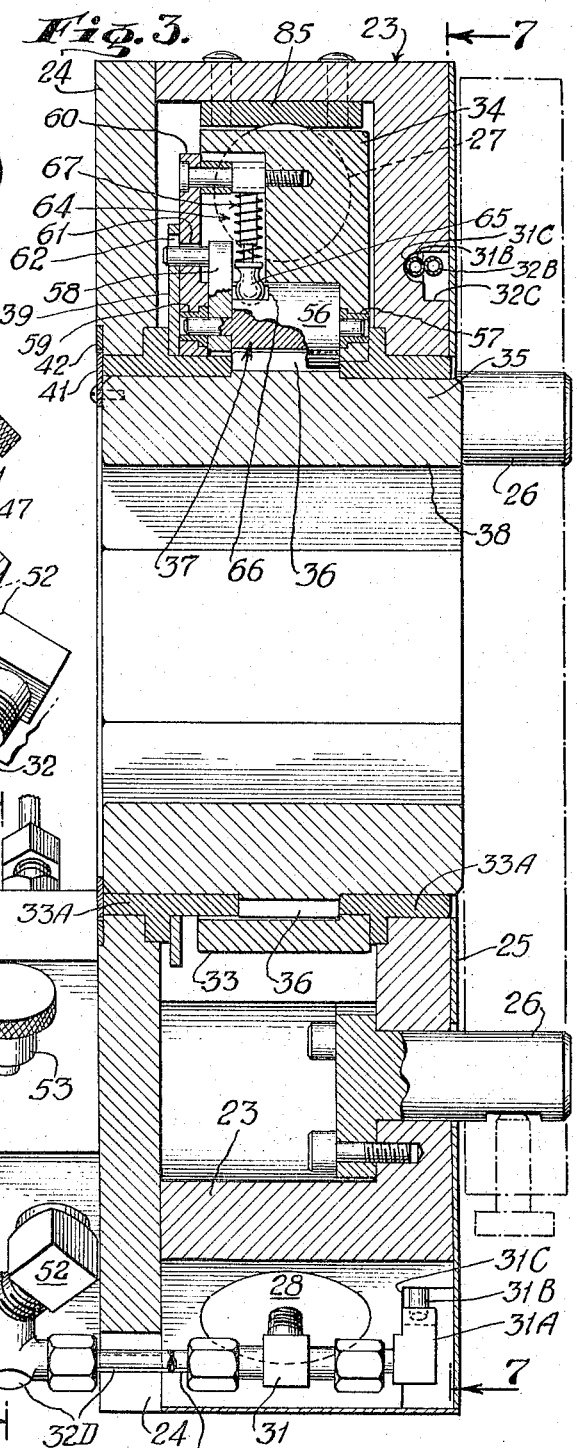
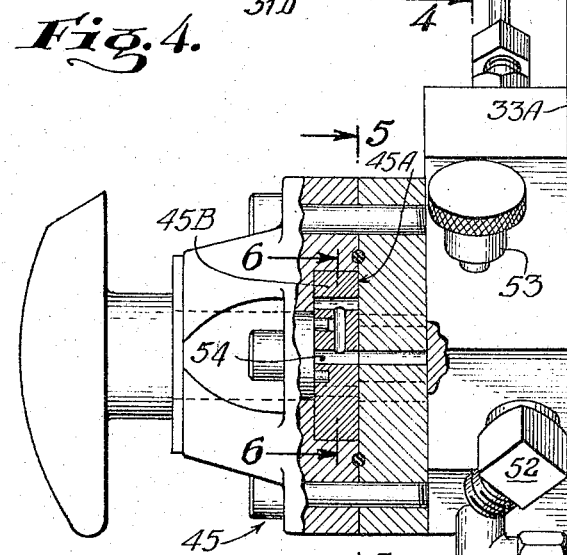
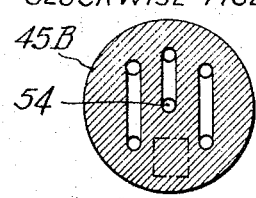

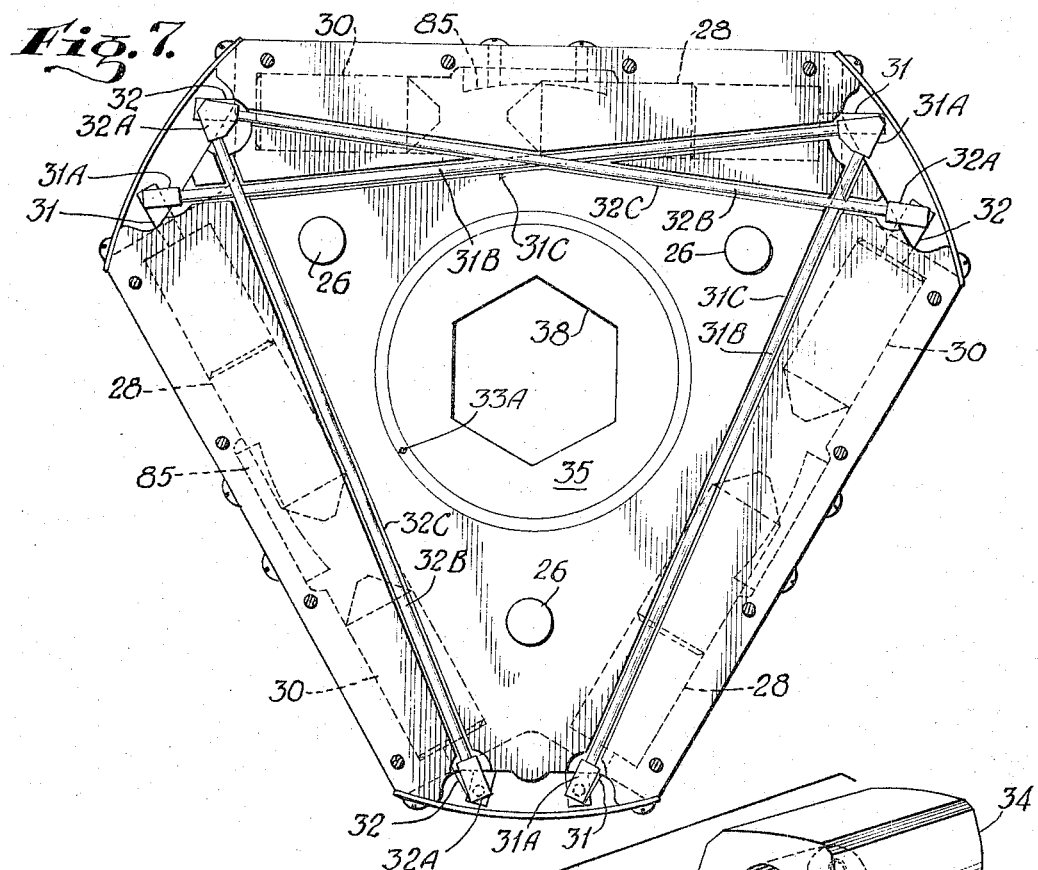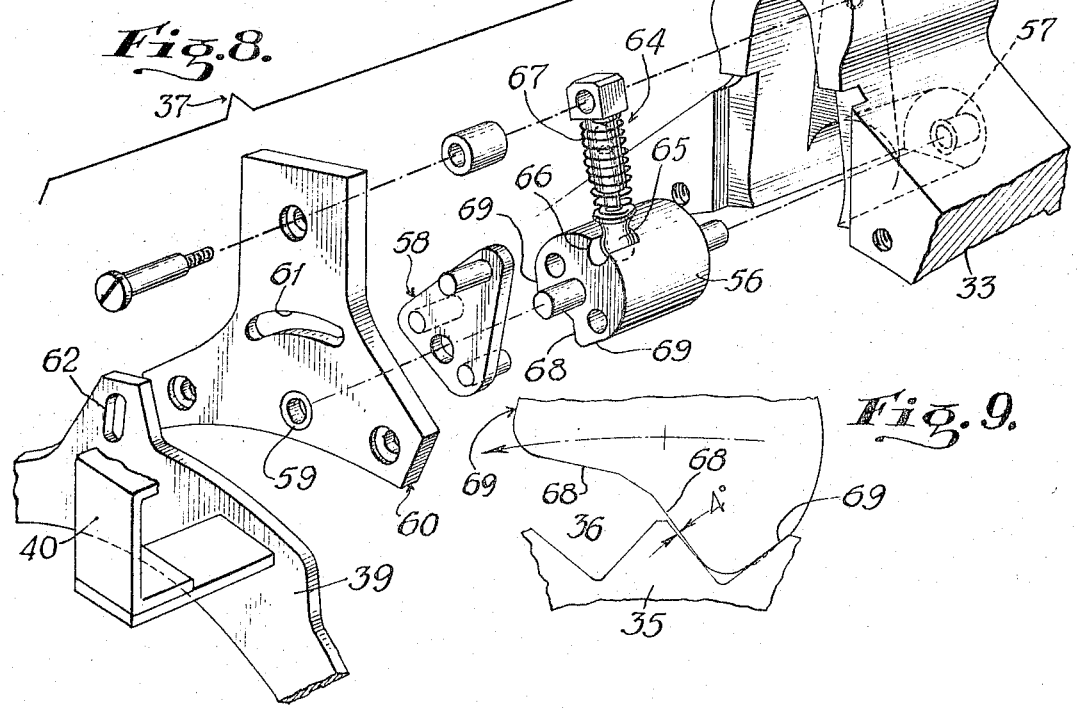

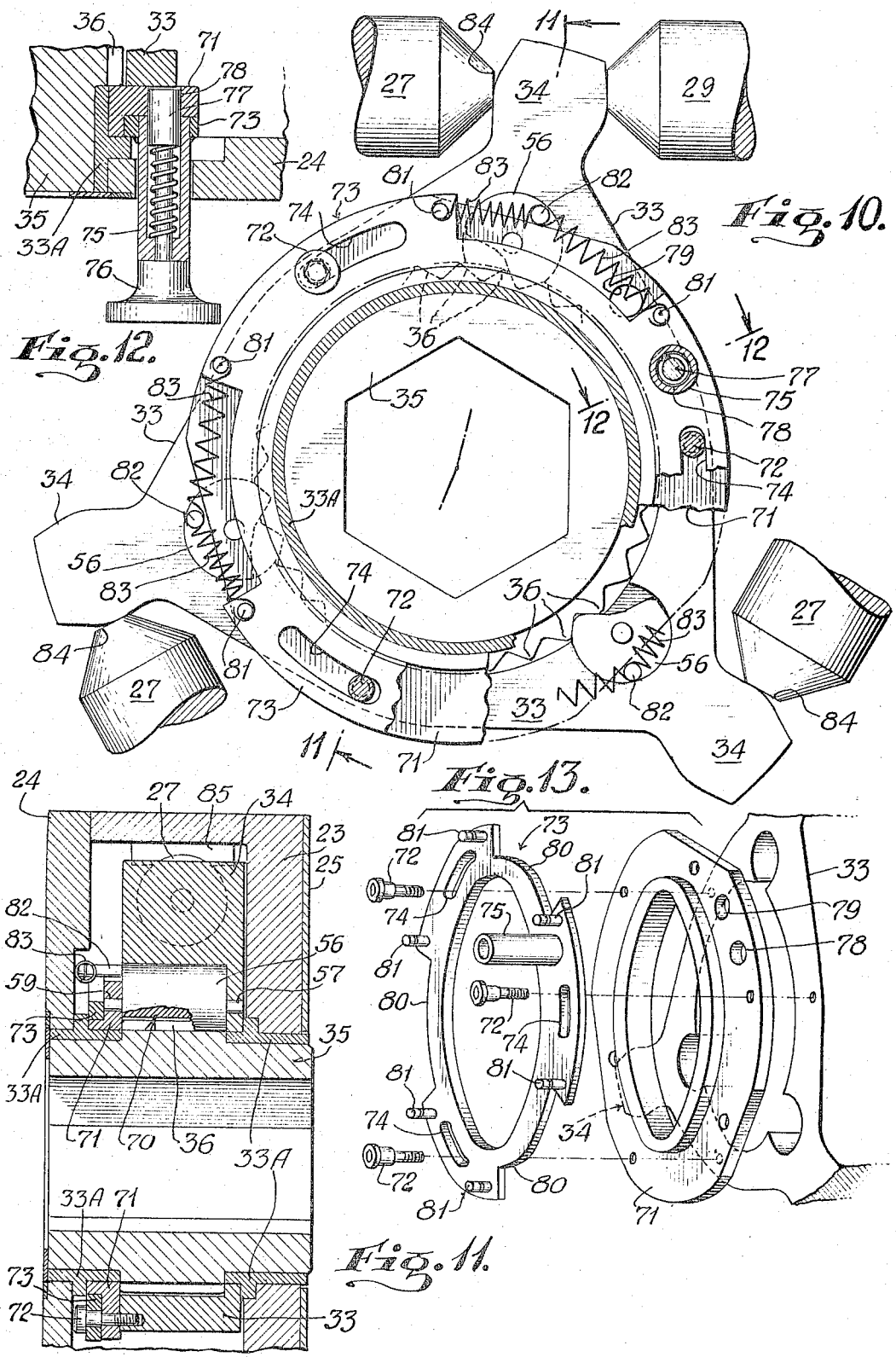

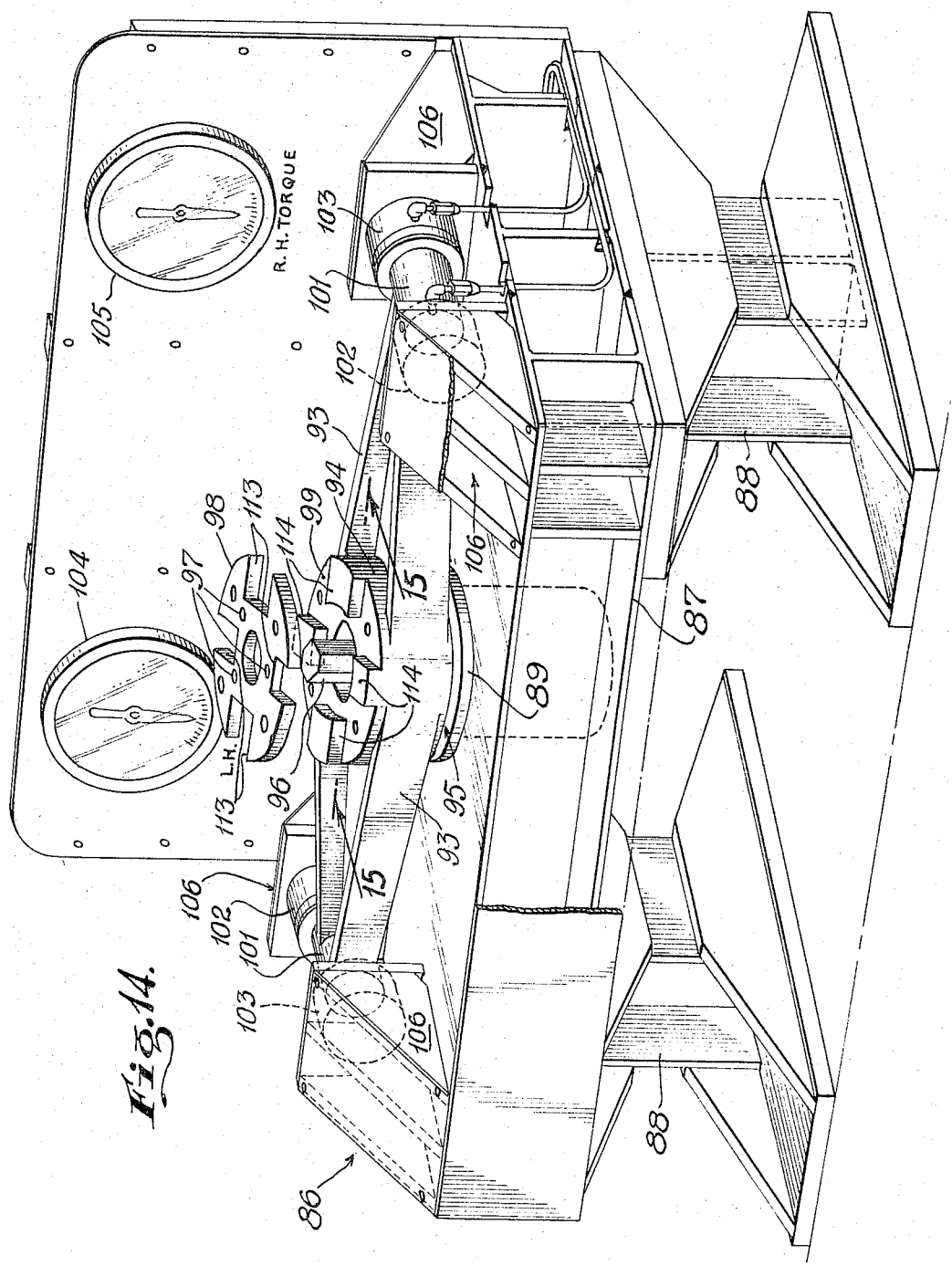

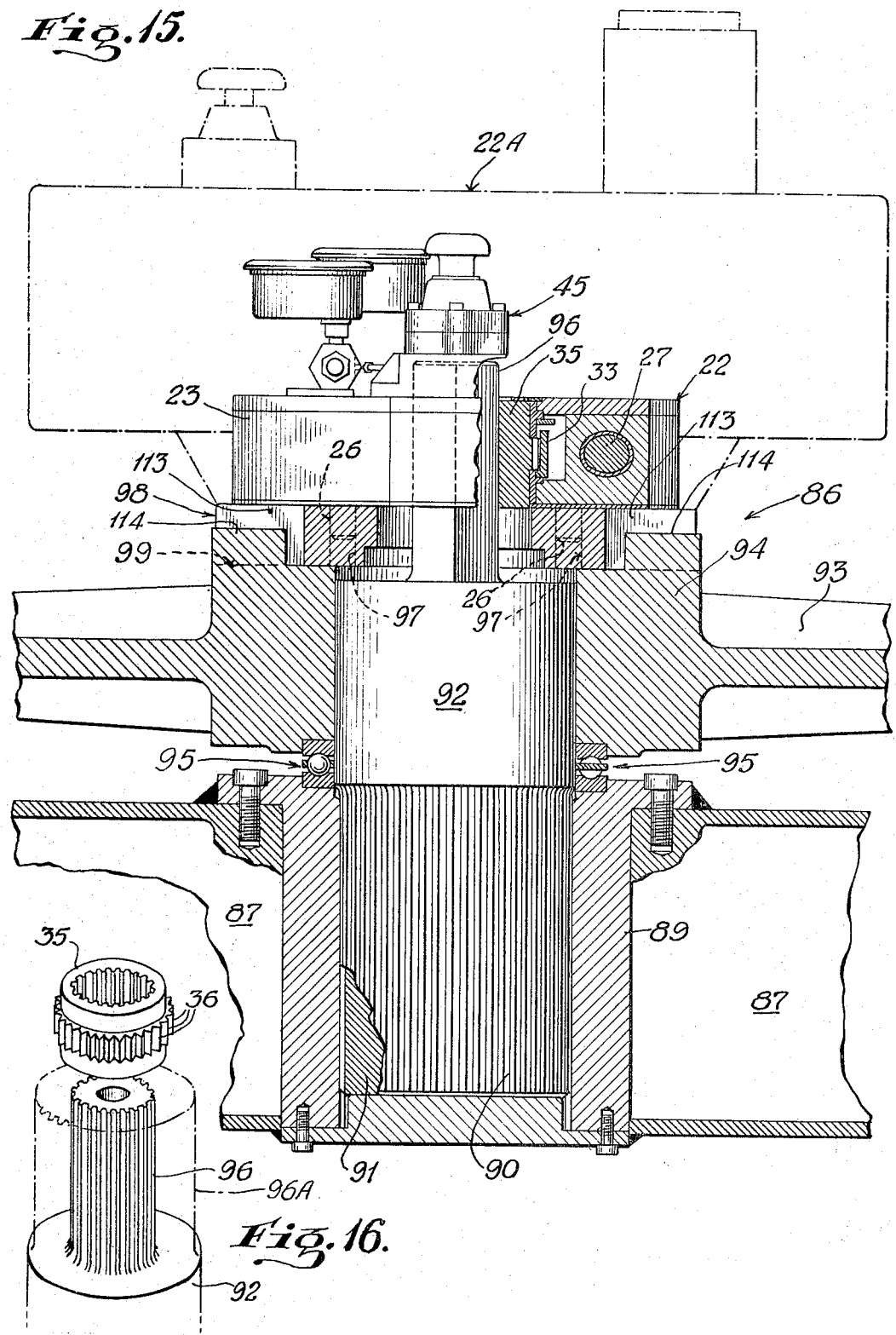

March 12, 1968   A. E. AMANTI ET AL   3,372,611
TORQUE WRENCHES AND TEST STANDS
Filed July 11, 1966   8 Sheets-Sheet 7

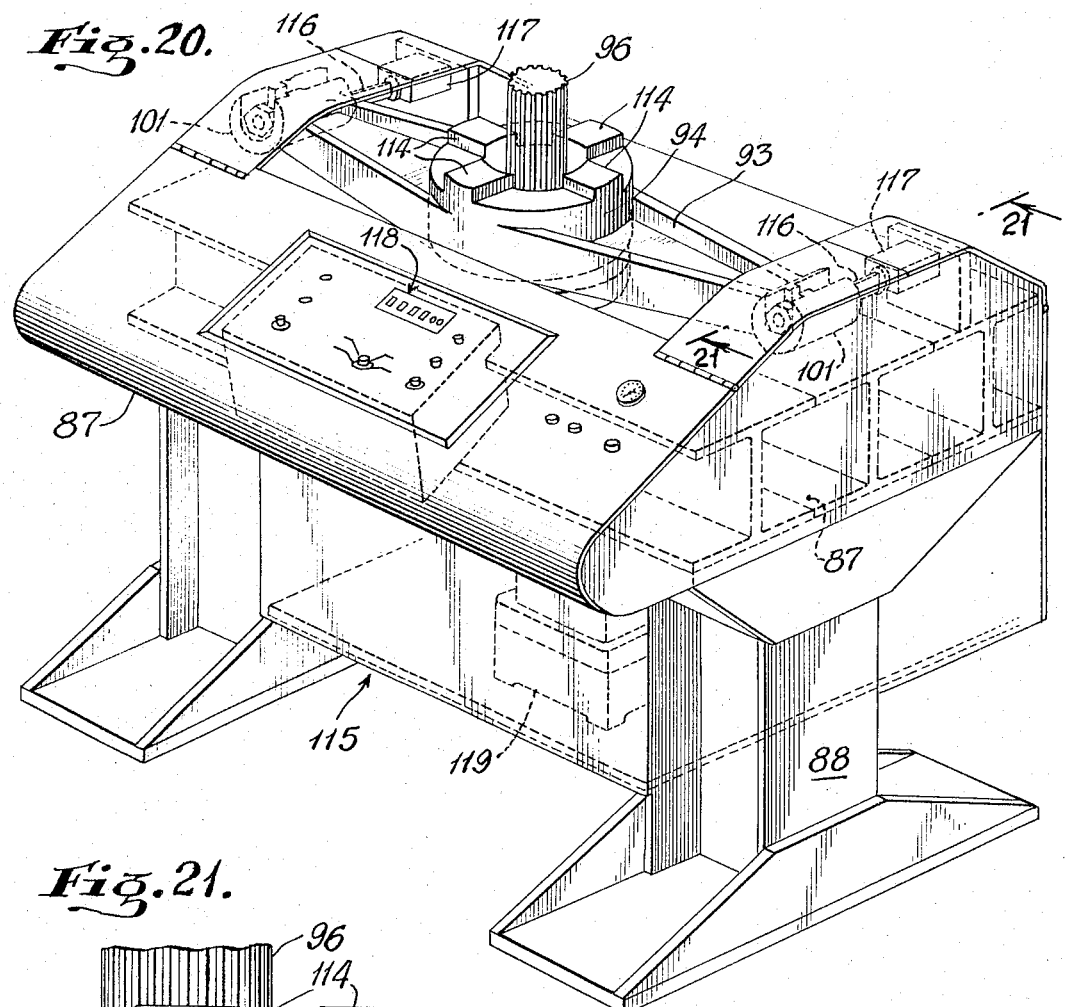
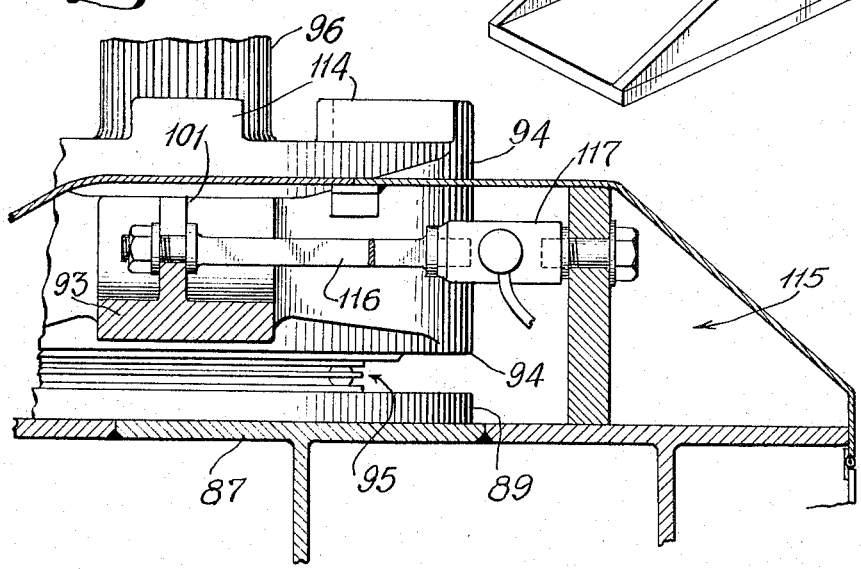

United States Patent Office 3,372,611
Patented Mar. 12, 1968

3,372,611
TORQUE WRENCHES AND TEST STANDS
Anthony E. Amanti, Westfield, and Ernst Krokenberger, Springfield, Mass., assignors to Advance Hydraulics, Inc., Westfield, Mass.
Filed July 11, 1966, Ser. No. 564,367
11 Claims. (Cl. 81—60)

*Improved torque wrenches and test stands*

This invention relates to heavy duty torque wrenches and test stands, and particularly to hydraulic torque wrenches capable of applying large amounts of torque without exceeding a predetermined maximum torque value calibrated on a novel torque wrench calibrating test stand.

*Problems of prior devices*

This invention is an improvement on the torque wrenches described in U.S. Patent 2,961,904, and those shown in the Feb. 16, 1959, issue of "Design News."

While the torque wrenches shown in Patent 2,961,904 are highly effective and provide many valuable improvements over conventional torque wrench devices, they incorporate several expensive features and certain components which introduce variations in the torque produced by these devices during operation. Furthermore, the relief valves incorporated in the devices of that patent are actuated only at the end of the torque stroke; they do not provide any selective torque limiting function, and torque calibration of such wrenches has been generally unsatisfactory. Finally, the resiliently biased pawls shown in this prior patent provide toggle-shifting of the torque ring incorporated in the device, but they rely on substantial sliding friction, and may be stiff and awkward to operate.

The improved torque wrenches of this invention comprise relatively angularly movable, concentric ring-shaped structures connected by reversible, hydraulic-jack type power linkages to provide reciprocating relative angular movement between two concentric ring-shaped members. A third ring-shaped member, driven by a resiliently-biased toggle-shifted ratcheting pawl mechanism, transmits successive increments of relative angular movement to the nut or workpiece to which torque is applied.

In the cooperating torque wrench and test stand systems of this invention, improved toggle-shifted ratcheting pawl mechanisms transmit hydraulically-produced jacking forces from angularly movable to rotatable torque-conveying ring members with high efficiency. Sliding friction is minimized at the various contact zones between movable parts, and distortion, wear and unproductive component forces are much reduced. The hydraulic force-producing assemblies of this invention are more economical and efficient, and the calibrating test stands are capable of calibrating torque wrenches of different sizes with precision and convenience.

*Objects*

Accordingly, a principal object of the present invention is to provide torque wrenches which are relatively economical to build and manufacture, incorporating features which increase the efficiency and trouble-free operation of the devices.

A further object is to provide such torque wrenches producing in minimum variations torque loading throughout the stroke of the devices.

Another object is to provide such torque wrenches incorporating ratcheting toggle pawl mechanisms having minimum friction and maximum efficiency.

A further object is to provide calibrating test stands cooperating with such torque wrenches of different sizes and capable of calibrating normal and limiting torque values for all sizes of such torque wrenches.

*Figures*

Other and more specific objects will be apparent from the features, elements, combinations and operating procedures disclosed in the following detailed description and shown in the drawings, in which:

FIGURE 1 is a front perspective view of an improved torque wrench of the present invention;

FIGURE 2 is a top plan view of the torque wrench shown in FIGURE 1, partially broken away in cross section and with its top cover plate removed to show its structural features and advantages;

FIGURE 3 is a sectional side elevation view of the same device taken along the line 3—3 in FIGURES 1 and 2, and showing the manual hydraulic control valve mechanism;

Figure 17:
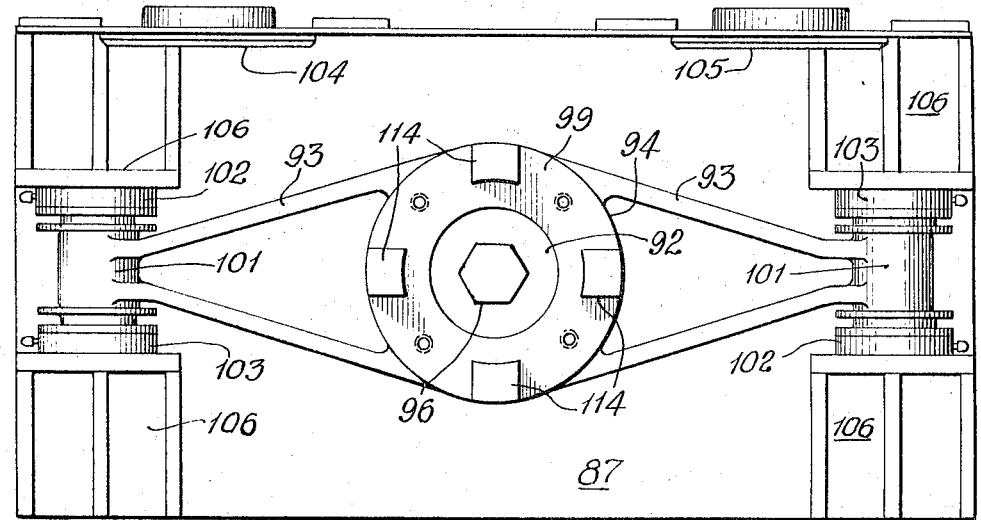
Figure 18:
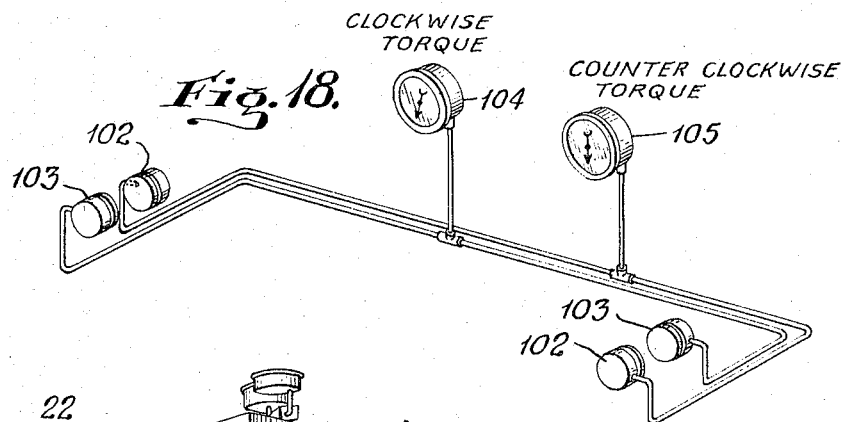
Figure 19:
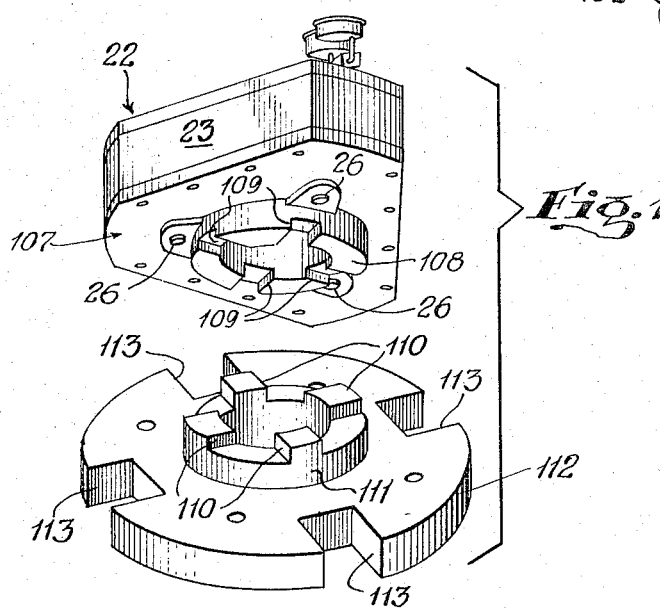

FIGURES 4, 5 and 6 are successive top plan sectional views, taken along the respective planes 4—4, 5—5 and 6—6 indicated in FIGURE 3, showing the cooperative structural features of the manual hydraulic control valve;

FIGURE 7 is a bottom plan view of the device, showing the wrench casing with its bottom cover plate removed to display additional novel features of the wrenches of this invention;

FIGURE 8 is an enlarged, fragmentary, exploded perspective view of a first form of resiliently-biased toggle-acting pawl mechanism incorporated in the wrenches of this invention;

FIGURE 9 is an enlarged schematic plan view of the engaged pawl and ratchet tooth construction showing the desired features preferred in the torque wrenches of this invention;

FIGURE 10 is a top plan view corresponding to the view of FIGURE 2 and showing a modified form of torque-transmitting ring incorporated in a second embodiment of the present invention;

FIGURE 11 is a fragmentary sectional side elevation view of the torque ring shown in FIGURE 10 and its associated components in the wrenches of this invention;

FIGURE 12 is an enlarged fragmentary sectional elevation view of the same device, showing a spring-biased manual selector knob employed to shift between clockwise and counterclockwise torque modes of the device;

FIGURE 13 is an exploded perspective view of the relatively shiftable sliding ring assembly associated with the torque ring construction shown in FIGURE 10;

FIGURE 14 is a front perspective view of a heavy duty test stand employed with the torque wrench illustrated in the previous figures for testing and calibrating the normal and maximum limit torque loadings produced by these wrenches;

FIGURE 15 is a front sectional elevation view of the central portion of the test stand shown in FIGURE 14, showing the cooperating fixed and angularly pivoting structural members employed to transmit the angular deflections produced by operation of the torque wrench being tested on the test stand;

FIGURE 16 is a fragmentary front perspective view of an alternate splined shaft used with a different embodiment of the test stand shown in FIGURES 14 and 15;

FIGURE 17 is a top plan view of the test stand shown in FIGURES 14 and 15, showing the torque sensing and indicating systems thereof;

FIGURE 18 is a schematic perspective view of the torque sensing and indicating systems shown in FIGURE 17;

FIGURE 19 is an exploded schematic view of the manner in which torque wrenches of different sizes cooperate with an adapter plate for installation on the test stand of FIGURES 14–18;

FIGURE 20 is a perspective view of a modified form of torque wrench test stand incorporating additional features of the invention, and FIGURE 21 is a sectional side elevation view of the modified test stand of FIGURE 20 showing the deflection-sensing transducer employed therein for measuring both clockwise and counterclockwise torque.

Improved torque wrenches

As shown in FIGURES 1 and 2, a torque wrench 22 of this invention comprises a generally triangular casing 23 having a large central aperture, with a similarly-shaped top cover plate 24 and a corresponding thin bottom plate 25. As shown in FIGURES 2 and 3, three sturdy anchor posts 26 are seated in recesses in the casing 23 with their ends protruding through suitable apertures in the casing 23 and bottom plate 25 to extend beneath the torque wrench 22. The anchor posts 26 provide a sturdy three-point anchorage for the casing 23 on a supporting fixture, and thus provide the stationary datum from which angular torque actuation is applied by the device.

Arrayed along the long sides of the casing 23 are three pairs of hydraulic piston and cylinder jacking assemblies 27–28 and 29–30. The cylinders 28 and 30 are preferably circular in cross-section, with their open ends facing each other near the center of each flat side of the triangular casing 23, arrayed coaxially and with their remote ends threadedly anchored in the casing and provided with hydraulic ports 31 and 32 and corresponding piping fittings.

Torque spider

Pivotally mounted in the large central aperture for free, concentric angular movement relative to casing 23 is a three-armed torque spider 33 formed as a ring-shaped structure with three symmetrical protruding arms 34 extending radially outwardly into the spaces between the three pairs of cylinders 28 and 30. Oilite ring bearings 33A support spider 33 for rotary movement in casing 23.

The corresponding pairs of pistons 27 and 29 extend from the open ends of their respective coaxial cylinders 28 and 30 into abutting contact with opposite faces of arms 34. Actuation of the hydraulic systems supplying pressurized hydraulic fluid to each pair of cylinders 28 and 30 through their end ports 31 and 32 assures firm abutting contact of both pistons 27 and 29 of each pair with their respective arm 34 of the ring-shaped torque spider 33, causing evenly-balanced relative angular movement of the spider 33 with respect to the casing 23.

Journaled in Oilite ring bearings 33A for free angular rotation about the common axis of the concentric torque spider 33 and casing 23 is a torque ring 35, a third, ring-shaped member having ratchet teeth 36 in its outer periphery cooperating with a pawl assembly 37 mounted on each arm 34 of spider 33. A central aperture in torque ring 35 is formed as a hexagonal, torque-transmitting jaw opening 38 shaped to receive and transmit torque to the nut or other pivoting or rotating member which may be considered the workpiece of the device, and which is normally presented for torquing rotation concentrically aligned within the triangle formed by the axes of the three rearwardly protruding anchor posts 26.

The resiliently biased pawl assembly 37 is shifted from its clockwise torquing mode shown in FIGURE 2 to its opposite, counterclockwise torquing mode by relative angular shifting of a shifting ring 39 carried on the ring bearings 33A beside torque spider 33. Extending upward and radially outward from ring 39 is a shifting handle 40 extending through a suitable slot in the top cover plate 24 of the casing 23, as shown in FIGURE 1. Manual angular movement of handle 40 over-rides the normal resilient biasing of pawl assembly 37, to provide shifting between modes whenever desired. Handle 40 may be actuated by automatic control systems if desired.

Torque ring 35 may be provided with a 360-degree dial 41 around its periphery abutting a stationary 360-degree scale 42 formed on the top plate 24 (FIGURE 1). In addition, one arm 34 of the spider 33 may be provided with an arrowhead 43 or other indicator pointer which may be viewed through a suitable aperture or window 44 formed in top cover plate 24.

Hydraulic system

Anchored near one apex of the triangular top cover plate 24 is a manual valve assembly 45 shown in FIGURES 1 and 3–6. As shown in FIGURES 2 and 7, the hydraulic ports 31 supplying hydraulic fluid to the three "clockwise" cylinders 28 are connected by suitable pipe fittings 31A to conduits 31B preferably formed of stainless steel tubing brazed to the fittings 31A to form leakproof high pressure hydraulic lines, and preferably recessed in grooves 31C cast or milled in the rear or bottom face of the casing 23, as shown in FIGURE 7.

Correspondingly, the end fitting 32 delivering hydraulic fluid to the counterclockwise cylinders 30 are all connected by suitable fittings 32A brazed to similar stainless steel conduit lengths 32B similarly recessed in suitable grooves 32C formed in the rear or bottom face of casing 23. To facilitate the three cross overs of the conduits 31B and 32B, the grooves 31C may be formed deeper than the grooves 32C, as indicated in FIGURES 3 and 7, so that the recessed conduits 32B lying in grooves 32C can cross over the more-deeply recessed conduits 31B lying in deeper grooves 31C without distortion at the crossover points.

By using tubing recessed in grooves in this manner, pressure-type brazed joints may be formed, tested and assured of hydraulic integrity without relying on long through-passages bored in the casing 23 and all the associated gasketing and sealing fittings required for such integral, bored hydraulic passageways. Furthermore the hydraulic assemblies 31B and 32B may be preformed on a production line where quality control inspection assures their hydraulic integrity, and respective clockwise and counterclockwise hydraulic line assemblies may then be fitted conveniently into their grooves in torque wrench casing 23 during fabrication, for maximum protection by the groove walls against bumps, shocks, impacts or acceleration loading of the device.

Hydraulic control valve

As shown in FIGURE 3, the lowermost clockwise hydraulic torque fitting 31 is connected by a suitable clockwise pressure conduit 31D to a clockwise passageway 46 terminating in a clockwise port forming one of the ports in a face 45A of the four-way control valve 45, as shown in FIGURES 4 and 5.

Correspondingly, the lowermost counterclockwise hydraulic fitting 32 is connected by a similar counterclockwise pressure conduit 32D (FIGURE 2) to a similar counterclockwise pressure passageway 47 (FIGURE 4) likewise terminating in a counterclockwise port diametrically opposite the clockwise port 46 across the face 45A of the four-way valve 45.

Pressurized hydraulic fluid is supplied to the valve 45 through a pump conduit 48 (FIGURE 4) connected by suitable fittings either directly or through a manual adjusting valve (not shown) to pressure port 50 forming a third port of the four ports in the face 45A of four-way valve 45, located on the same radius and halfway between the clockwise port 46 and the counterclockwise port 47.

Diametrically opposite the pressure port 50 at the same radius on the four-way valve face 45A is a return port 51 connected through a return passageway and suitable fittings to return conduit 52 leading into a sump communicating with the pressurizing pump (not shown).

A suitable bypass bleed valve 53 may be provided with a needle tip fitted in a passageway 53A joining the pressure port 50 with the return port 51 in the block of control valve 45, as shown in FIGURE 4. The bypass needle valve 53 may be adjusted manually within passageway 53A to retard the normal rate of operation of the device, or it may be provided with an adjustable, resiliently-biased relief valve mechanism limiting the buildup of hydraulic pressure in the system to any predetermined maximum pressure corresponding to a preselected maximum torque to be applied by the device.

As shown in the cross-sectional views of FIGURES 3 and 6, control valve 45 has a rotatable four-way valve element 45B turned by the valve handle and provided with four axial apertures spaced at the same radius and corresponding to the ports 46, 47, 50 and 51, interconnected in two pairs to reverse the flow of pressurized hydraulic fluid through the hydraulic system at the operator's command. The valve element 45B is also provided with an intermediate peripheral inlet port at the same radius joined by a bridge passageway to a central axial aperture terminating at a bypass port 54 aligned with a central axial passageway in the valve block connected directly to return port 51 via passageway 53A. This provides a "neutral" position for the handle of the valve 45, in which the hydraulic fluid from the pump conduits 48 is admitted through pressure port 50 and valve element 45A via coaxial bypass port to circumvent the needle portion of bypass valve 53, to avoid undesired pressure buildup in the hydraulic system.

From a comparison of the sectional view of the rotatable valve element 45B shown in FIGURE 6 with the corresponding valve ports shown in the valve block 45 of FIGURE 5, it will be seen that the two adjacent pairs of ports in the element 45B connected by passageways may be oriented by manual shifting of valve element 45B to either vertical or horizontal positions in the schematic diagrams of the figures.

In the vertically connected position or "clockwise power" mode, pressure port 50 is connected to clockwise port 46 and return port 51 to counterclockwise port 47— producing clockwise movement of the pistons 27 and 29 in all of the cylinders as shown in FIGURE 2, and corresponding clockwise angular movement of the spider 33 and its central torque ring 35 to drive the nut keyed in the central hexagonal jaw opening 38 thereof in a clockwise direction.

Alternatively, by shifting the handle of valve 45 to move element 45B to the horizontally connected position or "counterclockwise power" mode, the pressure port 50 is connected to the counterclockwise port 47 while the return port 51 is connected to the clockwise port 46, producing counterclockwise movement of the pistons 27 and 28 in all of the cylinders with corresponding clockwise angular movement of the spider 33.

In the position of the pawl assemblies 37 shown in FIGURE 2, the pawls ratchet counterclockwise during this angular movement of spider 33 to take successive new positions in engagement with new teeth 36 on the torque ring 35 until the counterclockwise indexing movement is completed. By shifting valve 45 again to its clockwise driving position, a new cycle of clockwise actuation of the spider 33 and its torque ring 35 is initiated.

In order to shift the torque wrench to its counterclockwise torque mode, delivering counterclockwise torque to the torque ring 35, with clockwise ratcheting indexing of torque spider 33, the pawl assemblies 37 are shifted by actuation of handle 40 to move shifting ring 39.

*Pawl assemblies*

A first type of resiliently-biased, toggle-shifted pawl assembly 37 is illustrated in FIGURES 2, 3 and 8. This pawl assembly 37 is shown in the top plan view of FIGURE 2, and is shown in vertical sectional elevation in FIGURE 3 and in the exploded view of FIGURE 8. In the upper portion of these figures is an arm 34 protruding radially upward from the ring-shaped torque spider 33. Recessed within a cavity in the arm 34 is the spring biased toggle assembly 64 and a pawl drum 56 mounted for pivoting on two axial studs, a rear stud journaled in an Oilite bearing 57 in spider 33, and a front stud passing through an aperture in a generally triangular crank plate 58 into a similar Oilite bearing 59 in a closure plate 60 secured by machine screws to the top face of the spider 33 overlying the cavity formed in the arm 34.

Crank plate 58 is formed with suitable shifting studs fitting in aligned holes in the abutting end of pawl drum 56, and at a crank arm distance removed from the drum studs to provide suitable shifting torque a crank stud protrudes forward through a curved slot 61 in closure plate 60 to fit into a radial slot 62 formed in the angularly movable shifting ring 39.

The interfitting and concentrically movable components of the torque wrench device are shown assembled in FIGURES 2 and 3, where it will be seen that the central aperture in the casing 23 has slidably journaled therein the angularly movable torque spider 33 with the arms 34 extending radially outward into the spaces between the pistons 27 and 29 and carrying recessed within the arms 34 the journaled pawl drums 56 and their associated resiliently biased toggle-shifting mechanisms.

The forwardly protruding crank stud extending from crank plate 58 through the curved slot 61 and the radial slot 62 formed in the shifting ring 39 are shown at the upper portion of FIGURE 3, where it will be seen that shifting ring 39 is journaled on spider bearing 33A, permitting relative angular movement of ring 39 by handle 40, and thus moving its radial slot 62 sidewise, angularly pivoting crank plate 58 about the axis of the studs journaling bearings 57 and 59 to pivot the pawl drum 56 angularly from one side to the other, corresponding to the two angular limit or "toggle" positions of the compressible and extensible toggle assembly 64. This assembly incorporates a telescoping sleeve-and-shaft having an eye at its upper end pivotally mounted on the outermost screw joining closure plate 60 to the outer end of arm 34, and having a ball 65 at its lower end fitted within a corresponding socket 66 formed in the abutting rim of pawl drum 56. The eye and the ball of the toggle assembly 64 are urged apart by such means as the compression coil spring 67 surrounding the central telescoping shafts joining these two members in the clockwise position of the toggle assembly 64.

The pawl drum 56 is provided with two pawl teeth defined by a ratcheting face 68 and a drive face 69. The pawl teeth are alternatively engaged with the torque ring teeth 36, and a clockwise pawl tooth 68–69 is shown in driving engagement in FIGURE 9. Counterclockwise operation of the device will cause ratcheting retraction in the counterclockwise direction of spider 33 about torque ring 35, with the compressible toggle assembly 64 allowing pawl 56 to ratchet pivotally with the driving pawl tooth, extending into engagement between corresponding torque ring teeth 36, being withdrawn and partially rocked pivotally past successive teeth 36 of torque ring 35 during this counterclockwise retraction of spider 33. This ratcheting withdrawal of the torque transmitting members to permit their indexing realignment is facilitated by a clearance angle of about four degrees between the face of each tooth 36 on ring 35 and the abutting ratcheting tooth face 68 on pawl drum 56, as shown in FIGURE 9. This four-degree clearance angle or rake angle between the face 68 and its abutting surface of tooth 36 permits a corresponding slight counterclockwise "withdrawal" rotation of the spider 33, carrying with it pawl drum 56, before any substantial relative ratcheting rotation of the pawl drum 56 occurs, thus minimizing grinding abrasion between the adjacent drive face 69 of the drive tooth pawl drum 56 and its abutting surface on tooth 36 by separating these surfaces before pawl-ratcheting occurs. This produces smooth, efficient, long-wearing operation for the toggle-shifted ratcheting pawl mechanism 37 shown in FIGURES 2, 3, 8 and 9.

An alternative form of pawl assembly 70 incorporated in a different embodiment of the torque wrenches of this invention is illustrated in FIGURES 10–13. In this modified pawl assembly 70, the pawl drum 56 again has its rear stud journaled in Oilite bearing 57 at the base of the arm 34 on spider 33, but its forward stud is journaled in a corresponding bearing 59 formed in a closure ring 71 bolted to the upper face of spider 33 by three through machine bolts 72.

Overlying closure ring 71 is an angularly movable shifting ring 73 having three peripheral slots 74 spaced about its circumference slidingly accommodating the through bolts 72 and providing axial and radial anchoring with sliding angular freedom for the shifting ring 73. Protruding outward through a suitable handle aperture in the top cover plate 24 from the upper face of shifting ring 73 is a shifting sleeve 75 having protruding from its outer end a shifting knob 76 joined to a spring biased plunger 77 slidingly telescoped within sleeve 75 and resiliently urged toward closure plate 71 to engage with one of two indexing apertures therein, a clockwise aperture 78 and a counterclockwise aperture 79 both shown in FIGURES 10 and 13. Thus the shifting sleeve 75 and shifting knob 76 take the place of the handle 40 shown in FIGURES 1 and 8.

The outer rim of the shifting ring 73 is provided with three symmetrical radial recesses 80 spanning the exposed outer face of the three pawl drums 56, as shown in FIGURE 10. Flanking each recess 80 are two outwardly extending spring anchoring studs 81, a corresponding crank stud 82 protrudes from the exposed face of the pawl drum 56 pivotally mounted at the base of each arm 34 of the spider 33, and each pawl drum 56 is provided with a pair of tension coil springs 83. These heavy tension springs each have one end anchored on the crank stud 82, and the opposite free end of each tension spring 83 is similarly anchored to one of the studs 81 flanking the recess 80 at the crank stud 82 on pawl drum 56.

As shown in FIGURE 10, when the plunger 77 is engaged in the clockwise aperture 78, the spring 83 joining crank stud 82 to the stud 81 on the clockwise side of its recess 80 is under considerable tension, urging crank stud 82 in a clockwise direction to bias pawl drum 56 clockwise, to transmit clockwise torque from spider 33 through pawl drum 56 to teeth 36 on ring 35.

Conversely, when knob 76 is withdrawn to pull plunger 77 from clockwise aperture 78 and shifted over to counterclockwise aperture 79, the clockwise studs 81 are moved closer to crank studs 82 while the counterclockwise studs 81 are withdrawn to extend and place under tension the counterclockwise springs 83, thus biasing pawl drums 56 in a counterclockwise direction to transmit counterclockwise torque from spider 33 through teeth 36 to torque ring 35.

With this shifting mechanism shown in FIGURES 10 through 13, shifting operation is performed with a minimum of sliding friction while the spring tension of springs 83 is applied with maximum advantage in a peripheral or tangential direction. In addition, large hollowed-out recesses in the torque bearing spider arms 34 are eliminated, and ratcheting operation of pawl drums 56 is facilitated by the substantially complete elimination of sliding friction in the toggle mechanism.

If desired, depressible plungers slidingly telescoped in the shifting ring 73 and urged toward crank stud 82 by compression springs (not shown in the drawings) may be employed to shift pawl drums 56. Also, the structure of the resilient detent plunger 77 may be reversed, with a separate depressed plunger (not shown in the drawings) mounted in each of the apertures 78 and 79, resiliently urged into latching engagement with sleeve 75, and disengaged by manual depression of a release pin telescoped within sleeve 75.

*Substantially unvarying torque*

The unique design of the load bearing surfaces of pistons 27 and 29 and their associated components assures tangential load transmission with minimum twisting and structural deformation of the torque wrench. The protruding ends of the pistons 27 and 28 are preferably chamfered, leaving a small flat bearing surface 84 in the central portion of their exposed ends, as shown in FIGURES 2 and 10. The abutting outer surfaces of the arm 34 facing these bearing surfaces 84 are formed in the manner of "involute" spur gear teeth to produce an axial tangent line of contact with surfaces 84. These arm contact surfaces are preferably sectors of right circular cylinders whose axes are parallel to the concentric axis of the ring 35 of spider 33 and casing 23, but spaced away from this common axis radially to intersect the coaxial center line of the cooperating piston and cylinder assemblies 27–28 and 29–30. The effective line of contact between the bearing surface 84 of each piston and its abutting cylindrical sector bearing surface of arm 34 will therefore be a straight line of tangency parallel to the concentric axis of the device, and lying on the bearing surface 84. Thus the driving force and the reaction force are applied by the pistons and arms 34 upon each other along lines of action substantially parallel to the coaxial center line of the piston and cylinder assemblies, largely avoiding lateral deformation of the pistons 27 and 29, and resulting lost radial force components. The efficiency of the torque wrenches of this invention is thus increased substantially by this construction.

Outward radial deflection of the pistons is further minimized by central deflection guides 85 each formed as a sector of a hollow cylinder substantially corresponding in inside diameter to the inside diameter of cylinders 28 and 30, and lying coaxial therewith, positioned along the outer side of the zone of coacting reciprocating movement of the pistons 27 and 29 with the arms 34 therebetween. The deflection guides 85 are positioned to receive and guide the protruding outer ends of both pistons 27 and 29 in their extended positions, as shown in FIGURE 2, when their respective cylinders provide the pistons with minimum support against radial deflection. In this manner guides 85 maintain the pistons 27 and 29 substantially in coaxial alignment with their respective cylinders, minimizing the sliding friction of the pistons therein and enhancing the efficiency of their operation. With these deflection guides in the positions shown in the figures, angular movement of spider 33 over a total angular distance of between 22 and 25 degrees provides good torque transmitting characteristics. Substantially uniform force is transmitted in a substantially unvarying tangential direction, providing generally uniform torque over the entire stroke of the device, with minimum radial deflection of the hydraulic pistons and corresponding high efficiency.

*Calibrating test stands*

The calibrating test stands of the present invention are highly useful for anchoring these heavy-duty torque wrenches and measuring the torque loads they produce. One form of test stand is shown in FIGURE 14, and a standard torque wrench 22 is placed for testing on the upper central part of the stand 86, as indicated in FIGURE 15. In these figures the test stand 86 is provided with a heavy table frame 87 formed of reinforced and welded heavy steel H-beams, mounted on sturdy supporting pedestals 88. A central vertical cylindrical mounting sleeve 89 is securely anchored in the central part of table 87. The inner wall of the sleeve 89 is preferably keyed or splined in engagement with the splined lower end 90 of a heavy vertical shaft 91, as shown in FIGURE 15. The central portion 92 forms a vertical trunion or journal bearing on which is pivotally mounted for horizontal angular movement a double ended test arm 93 whose hub 94 is formed with a circular journal aperture rotatably and slidably engaging the bearing surface 92 of shaft 91. The lower peripheral surface of the journal aperture in hub 94 is mounted on a thrust bearing, such as the ball bearing 95, shown in FIGURE 15, whose lower race surmounts the upper end periphery of the mounting sleeve 89, providing low-friction relative angular movement of sleeve 89 and test arm 93.

The upper end of shaft 91 is preferably formed with a cross section corresponding to that of the nut or angularly adjustable component with which the torque wrench is designed to interfit. Thus its upper end 96 may be square or hexagonal in cross section, or it may have the splined configuration shown in FIGURE 16, coacting with an internally splined torque ring 35 having standard teeth 36 for cooperation with the pawl drum 56 as previously described.

A standard torque wrench 22 as shown in its test position on the test stand 86 in FIGURE 15 and a much larger heavy duty torque wrench 22A is shown in dot-dash lines in the upper portion of FIGURE 15, similarly mounted in test position on the same test stand 86.

As shown in FIGURE 15 the upper end 96 of the shaft 91 extends upward through the torque ring 35 of the torque wrench 22 for engagement therewith. A large splined end 96A of shaft 91 shown in FIGURE 16 may co-act with the torque ring of this larger wrench. As shown in FIGURE 15 the anchor posts 26 protruding through the bottom plate 25 of the wrench 22 fit within the three corresponding anchor apertures 97 on the upper side of the adapter plate 98 mounted in torque transmitting engagement with the four-keyed hub face 99 of the test arm 93 as shown in exploded relationship in the perspective view of FIGURE 14, and in the assembled view of FIGURE 15. Thus in mounting the torque wrench 22 on the test stand 86, casing 23 of torque wrench 22 becomes the angularly movable component, while the torque ring 35 engaging the upper end 96 of shaft 91 is the relatively fixed component, anchored by shaft 91, whose lower splined end 90 is engaged in the mounting sleeve 89 secured in table 87 of the test stand 86. Upon actuation of the torque wrench 22, the torque produced within the device tends to create angular relative movement of ring 35 and casing 23 identical with those occurring during actual torquing use, permitting accurate calibration of the wrench 22 on the test stand 86.

Torque produced by the wrench tends to rotate test arm 93 about bearing 95 and its central journaled trunnion 92–94, relative to the stationary table 87. As shown in FIGURES 17 and 18, the extreme outer ends 101 of arm 93 are caught between force measuring pairs of load cells 102 and 103. The load cells 103 are positioned abutting the ends 101 of test arm 93 in counterclockwise directions, and will thus be actuated by counterclockwise deflection of arm 93 produced by so-called "clockwise" actuation of the torque wrench 22, tending to displace its torque ring 35 in a clockwise direction angularly with respect to its casing 23 which is anchored to test arm 93. Since the wrench component anchored during testing is the torque ring 35, casing 23 thus tends to move "counterclockwise" upon "clockwise" operation of the device.

The amount of the torque produced by the torque wrench 22 may be carefully measured by the sensitively calibrated load cells 103 and indicated by the clockwise torque dial 104 connected to both the load cells 103. Correspondingly, clockwise movement of arm 93 actuates the load cells 102 abutting the opposite sides of the ends 101 of arm 93 and positioned to be actuated by clockwise deflection of arm 93 produced by "counterclockwise" mode actuation of torque wrench 22, to be indicated on counterclockwise torque dial 105.

The load cells 102 and 103 are both securely anchored to heavy angle-buttressed anchor plate blocks 106, presenting substantially immovable supports for these loads cells on table 87 of test stand 86.

An alternative form of torque transmitting adapter is the heavy duty back plate 107, replacing plate 25 on the underside of the wrench shown in FIGURE 19. Back plate 107 has three apertured bosses extending radially, through which project the anchor posts 26, surrounding a radially keyed hub portion 108 with four radial peripheral keyways 109. The keyways 109 are separated by sector-shaped lands and dimensioned to interfit with four radial upper keys 110 on the corresponding hub 111 of an enlarged adapter plate 112, itself provided with four radial keyways 113 dimensioned to accommodate the four radial keys 114 on the abutting surface of the hub 94 of test arm 93, as shown in FIGURE 14.

A modified embodiment of the test stands of this invention is typified by the test stand 115 shown in FIGURES 20 and 21, incorporating a similar heavy duty table 87 which has pivotally mounted thereon a similar test arm 93. The extreme ends of test arm 93 in this embodiment 115 are secured by a force-transmitting bar 116 of predetermined cross-section to a double-acting tension-compression sensing transducer unit 117 such as the Schaevitz-Bytrex load cell designated "solid state load cell, JD series," or similar resistance wire strain gauges. These strain gauges 117 are connected by suitable circuitry to electrical control devices, which may include a digital display panel 118 and associated controls for actuating a hydraulic pump 119 mounted in the base of the test stand 115 for suitable connections to the torque wrench 22 mounted thereon for testing in calibration.

While the objects of the invention are efficiently achieved by the preferred forms of the invention described in the foregoing specification, the invention also includes changes and variations falling within and between the definitions of the following claims.

We claim:

1. A torque wrench comprising, in combination:
   a casing having a central aperture and a plurality of symmetrically spaced cavities extending radially therefrom,
   a torque ring rotatably supported in the central aperture and having an internal work-piece engaging aperture incorporating torque-transmitting means,
   reversible force-producing actuator means adjacent to each cavity,
   a spider
      rotatably and concentrically supported in the central aperture,
      having a corresponding plurality of radial arms each extending into one of the spaced cavities in the casing for rotary driving engagement by the actuator means,
      and with reversible, toggle-shifted torque-transmitting pawl means for connecting the spider and the torque ring in rotary driving engagement selectively in a clockwise or counterclockwise direction,
   and confining means radially outwardly of the arms restricting the lines of action of the forces transmitted by the actuator means to the spider arms to substantially tangential, non-radial directions.

2. The combination of claim 1 in which the confining means includes flat, substantially radial contact surface formed on the actuator means each presented in juxtaposition with a curved contact surface on one of the spider arms formed as a sector of a right circular cylinder whose axis intersects the tangential line of action of the actuator force applied to the spider arm, and extends in a direction substantially parallel to the concentric rotation axis of the spider and torque ring.

3. The combination defined in claim 1 in which each actuator means comprises a pair of co-axial hydraulic piston-cylinder assemblies flanking each spider arm, for reciprocating driving co-action therewith, including a pair of facing, open-ended cylinders each housing an extensible piston contacting the spider arm, with the confining means including a deflection guide overlying the spider arm aligned to retain both extensible pistons slidingly against outward radial deflection.

4. The combination defined in claim 1 in which each actuator means comprises a pair of hydraulic piston-cylinder assemblies mounted in said casing, operatively connected to a source of hydraulic pressure fluid by hydraulic pressure conduits recessed in grooves formed in outer surfaces of the casing, whereby the conduits may be pre-fabricated in shapes corresponding to their grooves, and will be protected from shocks and impacts by being recessed therein.

5. The combination defined in claim 4 including a first pressure conduit assembly having an effective outside diameter D recessed in a first casing groove having a depth of at least 2D, and a second pressure conduit assembly recessed in a second casing groove having a depth of approximately D, whereby the second conduit assembly may bridge the first conduit assembly at least at one groove-intersection cross-over point without interference.

6. The combination defined in claim 1 in which the torque-transmitting pawl means includes a pawl drum pivotally mounted on the spider and resiliently biased for pivotal rocking movement between two alternate positions in each of which only one of a pair of pawl teeth projecting from the pawl drum protrudes in torque-transmitting driving engagement with corresponding teeth formed in the torque ring, with each of the pawl teeth being bounded by an outer drive face and an inner ratcheting face raked at a clearance angle of approximately four degrees, to facilitate withdrawal disengagement of the drive face during indexing retraction of the pawl drum.

7. The combination defined in claim 6 in which the pivotally-mounted pawl drum is resiliently biased into its alternate positions by one of a pair of opposed tension springs, each
having one end connected to a crank arm spaced away from the pivoting axis of the pawl drum,
and the other end connected under tension to an angularly spaced peripheral point on a concentric shifting ring angularly shiftable to either of two positions in which one of the tension springs is extended to override the other.

8. The torque wrench defined in claim 1, including torque-transmitting fixture means extending from the casing for anchoring the wrench during operation, in further combination with a calibrating test stand
having a substantially immovable stationary table provided with a workpiece-simulating shaft extending centrally upward therefrom on a central axis,
a double-ended test arm mounted on the table for pivotal movement about the central axis, with a central upper fixture face apertured to engage the fixture means extending from the torque wrench casing, disengageably anchoring the wrench with its workpiece-engaging aperture interfitting with the workpiece-simulating shaft,
and torque-indicating means operatively connected by force-sensing load cell means to both ends of the test arm,
whereby torque tending to produce angular movement of the test arm resulting from operation of the torque wrench may be accurately measured relative to the substantially immovable stationary table.

9. The combination defined in claim 8, further including an adapter plate having first fixture means for engagement with the first fixture face of the test arm, and a second, different fixture face for torque transmitting engagement with a different torque wrench fixture means, whereby the test stand is adapted to calibrate torque wrenches having different configurations of fixture means.

10. The combination defined in claim 8 in which the force sensing load cell means is double-acting, whereby the test stand is adapted alternatively to indicate clockwise and counterclockwise torque produced by operation of the torque wrench mounted thereon.

11. The combination defined in claim 6 in which the pivotally-mounted pawl drum is resiliently biased into its alternate positions by one of a pair of depressible plungers each
positioned for engagement with a crank arm spaced away from the pivoting axis of the pawl drum, and
slidingly telescoped captively within an aperture formed in a concentric shifting ring angularly shiftable to either of two positions,
and cooperating with compressible resilient means urging the plungers toward the crank arm,
whereby shifting of the shifting ring selectively loads one of the compressible resilient means associated with one of the pair of plungers, providing shifting movement of the pawl drum about its pivoting axis.

References Cited
UNITED STATES PATENTS

| | | | |
|---|---|---|---|
| 1,812,816 | 6/1931 | Weaver | 81—54.5 |
| 2,729,997 | 1/1956 | Davis | 81—60 |
| 2,961,904 | 11/1960 | Sergan | 81—53 X |

JAMES L. JONES, JR., *Primary Examiner.*